Nov. 12, 1963  A. F. MITTERMAIER  3,110,873
UNITARY CLAMPING AND SUPPORT ARRANGEMENT FOR
COIL AND CORE ASSEMBLY
Filed July 26, 1960  2 Sheets-Sheet 1
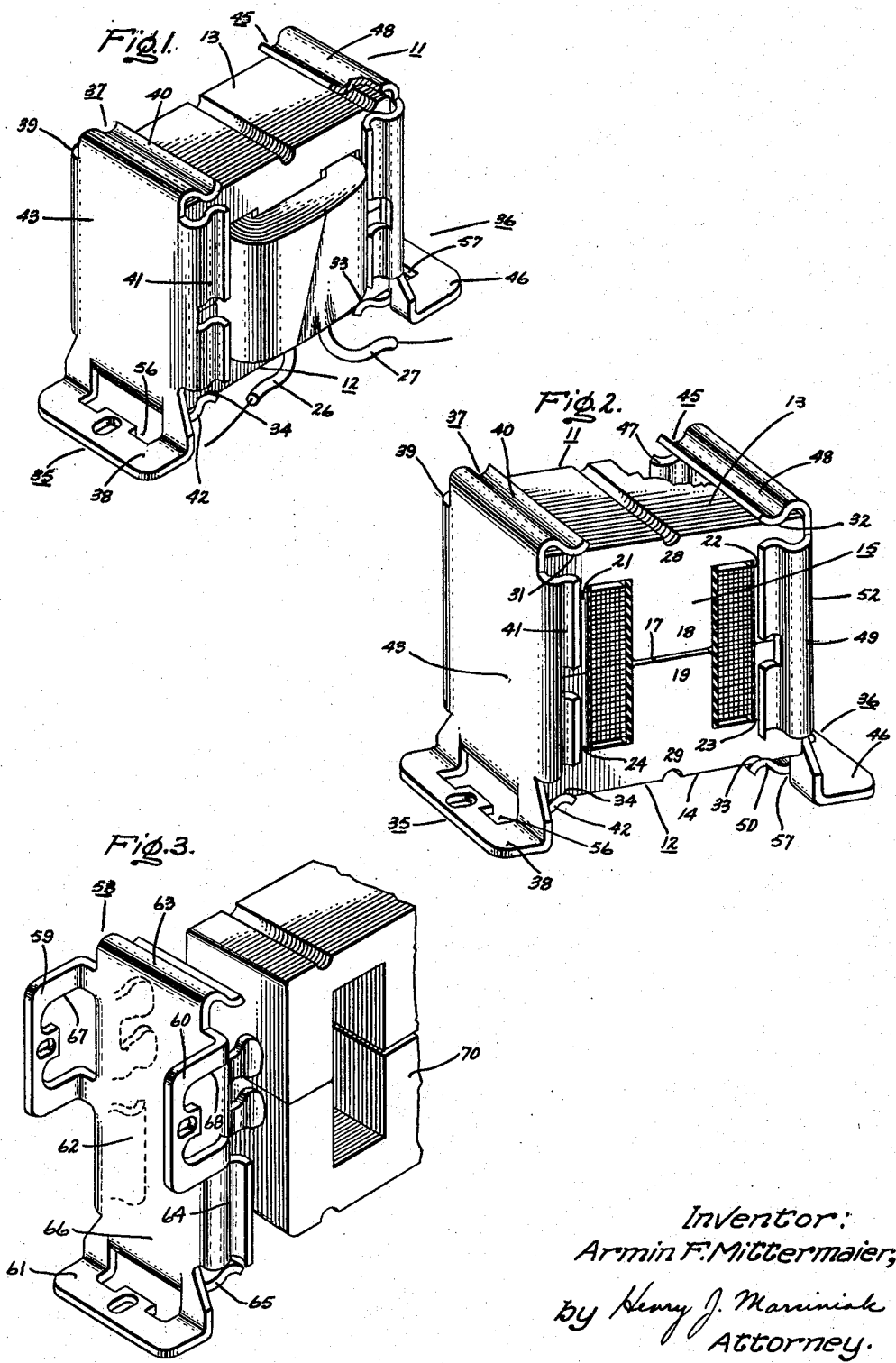
Inventor:
Armin F. Mittermaier,
by Henry J. Marciniak
Attorney.

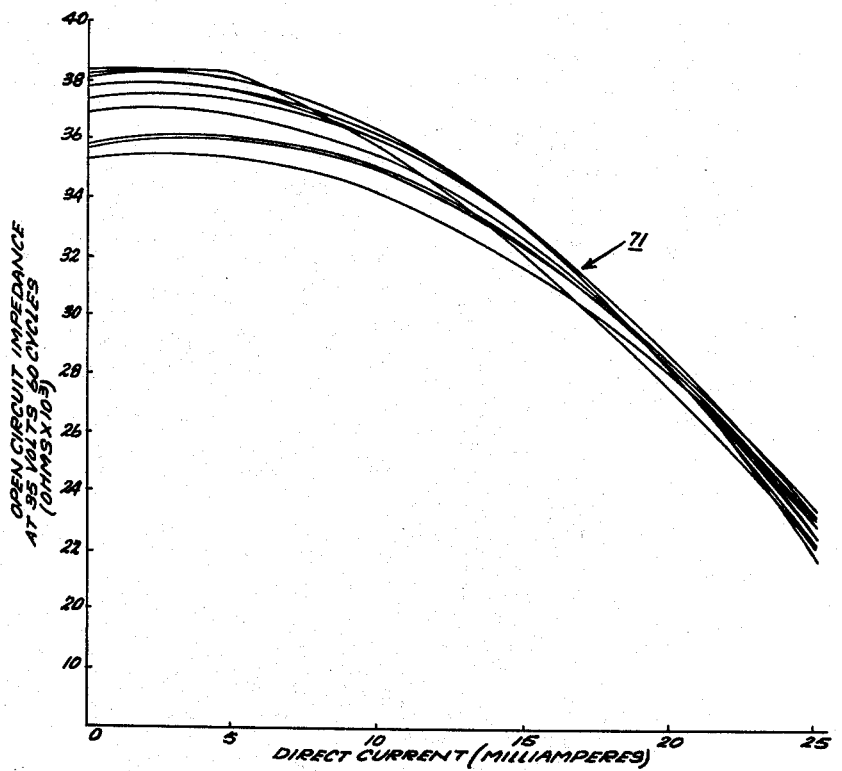

United States Patent Office 3,110,873
Patented Nov. 12, 1963

3,110,873
UNITARY CLAMPING AND SUPPORT ARRANGE-
MENT FOR COIL AND CORE ASSEMBLY
Armin F. Mittermaier, Fort Wayne, Ind., assignor to General Electric Company, a corporation of New York
Filed July 26, 1960, Ser. No. 45,368
1 Claim. (Cl. 336—210)

This invention relates to a combined clamping and supporting arrangement for electrical coil and magnetic core assembly.

Where a coil is mounted on a laminated magnetic core member, which is a common practice in many small single phase transformers of the shell-type such as are used in television receivers, it is necessary that some means be provided to support the electrical coil and magnetic core assembly and attach the assembly to the chassis or other framework in which the circuit components are assembled and mounted. The laminations of the magnetic core must be clamped tightly in compression, so as to prevent vibration and relative movement of the laminations and also to avoid undesirable air gaps between the laminations. Generally, the magnetic cores of many of the small single phase transformers of the shell-type are constructed of an E-shaped core wherein the magnetic circuit is completed by placing in abutting relationship with the three legs of the E-shaped lamination stack either another stack of E-shaped laminations or a stack of rectangular I-shaped laminations. The primary and secondary windings are wound one above the other in concentric fashion on the center leg of the core. The magnetizing reactance of the magnetic circuit is adjusted by the provision of an air gap in the center winding leg.

In applications where the magnetic core is comprised of two adjacent stacks of oppositely disposed E-shaped lamination, a predetermined air gap is provided by virtue of the fact that the center leg is shorter than the two outer legs. Similarly, in constructions in which the magnetic circuit is comprised of E and I-shaped laminations, the center leg is shorter than the two outer legs. When the outer legs are abutted against the I-shaped laminations in assembled relation, an air gap is thereby provided. Thus, to maintain the magnetizing reactance of the transformer at a predetermined fixed value, it is necessary that the core stacks be held and maintained in tightly assembled end-to-end relationship with each other to avoid increasing the air gap in the center winding leg.

In conventional mountable coil and core assemblies, channel type of clamps have frequently been used which have fit over the two outer legs of the E-shaped laminations and cover the outer legs of the magnetic core. Such a conventional arrangement is described in U.S. Patent 2,680,219—Gould, assigned to the same assignee as the present application. It was found that in such constructions of the prior art it was difficult to consistently maintain the air gap in the center leg of magnetic cores of transformers manufactured by semiautomatic assembly methods. It is therefore desirable that the mounting and clamping arrangement be such that when automatic or semiautomatic assembly methods are used the air gap can be consistently maintained. In addition, it is desirable to provide a unitary clamping and core means and to achieve a design that is as economical as possible both insofar as the material utilized and the total number of dissimilar parts required are concerned.

It is, therefore, the general object of this invention to provide an improved unitary clamping and supporting arrangement for a magnetic core and coil assembly that will achieve the desired results as set forth above.

A more specific object of this invention is to provide a combined clamping and supporting arrangement for a magnetic core and coil assembly having a core clamp portion which will securely clamp the lamination stacks tightly together in an end-to-end relationship in such a manner as to effectively maintain a predetermined air gap in the center winding leg of the magnetic core.

It is a further object of this invention to provide a core clamping and supporting arrangement which is economical to manufacture and which easily lends itself to automatic or semiautomatic assembly methods.

In accordance with the invention, a clamping and support arrangement for a magnetic core and coil assembly having a core formed of outer leg members disposed on opposite sides of a center winding leg is provided whereby a clamping and support member is juxtapositioned along the side of each of the outer leg members. Each clamping and support member is formed with a substantially intact web portion and arcuate clamping flanges disposed along the outer laminations of the outer leg members and transversely thereof along the edges of the laminations. Further, each clamping and support member has at least one mounting element integrally formed with a clamping element and has a cutout portion, the material removed from the cutout portion forming an adjacent arcuate clamping flange of the clamping element.

In another aspect of the invention the groove is provided on outer edges of the laminations of the magnetic core. The groove extends transversely across the edge of the laminations and is so arranged and disposed as to receive at least one of the arcuate clamping flanges of the clamping element. When the arcuate flange is engaged in the groove, the combined clamping and support member is securely attached to the core member, and lateral movement of the member is thereby prevented.

The subject matter which I regard as my invention is set forth in the appended claim. The invention itself, however, together with further objects and advantages thereof may be better understood by referring to the following description taken in connection with the accompanying drawings in which:

FIG. 1 is a view in perspective of a magnetic core and coil assembly of a transformer in accordance with the invention;

FIG. 2 is another view in perspective of the magnetic core and coil assembly shown in FIG. 1 with a portion of the coil and core cut away;

FIG. 3 is an exploded view in perspective of an alternative construction of a clamping element in accordance with the invention; and FIG. 4 represents a plot of the open circuit primary impedance at 35 volts, 60 cycles per second against direct current in milliamperes for ten identical representative transformers of the present invention.

Referring now to FIGS. 1 and 2 of the drawings, there is shown a transformer 11 having a magnetic core 12 made up of adjacent stacks of a pair of oppositely disposed E-shaped lamination stacks 13, 14. On a center winding leg member 15 of the magnetic core 12 is mounted a preformed electrical coil 16. The individual windings of the coil 16 are not shown since they do not form a part of this invention. On small transformers of the shell-type primary and secondary windings are generally wound one above the other in concentric fashion on the center winding leg member of the magnetic core whose magnetic circuit is completed by placing the outer leg member of the E-shaped laminations in juxtaposition. Each stack of the E-shaped laminations 13, 14 is made up of a plurality of superposed laminations of relatively thin magnetic material. Two coil leads 26, 27 are shown. Other electrical connections from the electrical coil 16 have been omitted for greater clarity since they do not form a part of this invention.

It will be noted that in the illustrative embodiment of the invention, the laminations comprising the magnetic core 12 are of identical E-shaped laminations. As shown in the cutaway portion of FIG. 2, an air gap 17 is provided in the center winding leg member 15 by virtue of the fact that the center legs 18, 19 are shorter than the corresponding pairs of outer legs 21, 22 and 23, 24 of the E-shaped lamination stacks 13, 14. It will be seen that outer leg members comprising the outer legs 21, 22, 23, 24, the center winding leg member 15 comprising the center legs 18, 19, and transverse member 28, 29 form a complete magnetic circuit. Grooves 31, 32, 33, 34 near the outside corners of lamination stacks 13, 14 are provided extending transversely across the laminations.

Clamping and support members 35, 36 are assembled at each end of the magnetic core 12. The clamping and support member 35 comprised of a clamping element 37 and a mounting element 38 is constructed so as to be inexpensively stamped or formed as in a press operation. Arcuate clamping flanges 39, 40, 41, 42 formed integrally with a web portion 43 of clamping element 35 extend outwardly and serve to tightly hold the laminations of the stacks 13, 14 in assembled relation. Similarly, clamping and support member 36 is comprised of a clamping element 45 and a mounting element 46. Arcuate clamping flanges 47, 48, 49, 50 are formed integrally with a web portion 52 of clamping element 45.

Each of the clamping and support members 35, 36 have an integrally formed mounting element 38 and 46, respectively. It will be noted that the arcuate clamping flange 42 of clamping element 37 was formed from material cut out from cutout portion 56 of mounting element 38. In the same manner, arcuate clamping flange 50 of clamping element 45 was formed from material cut out from cutout portion 57 of mounting element 46. By arranging the mounting elements 38, 46 so that the adjacent arcuate clamping flanges 42 and 50, respectively, are formed from the cutout portions 56, 57, it is possible to have sustantially intact web portions 43, 52. I have found that this results in the advantage that the arcuate clamping flanges 39, 40, 41, 42 and 47, 48, 49, 50, effectively maintain the lamination stacks 13, 14 tightly in an end-to-end relationship and also maintain the laminations in assembled relation. Thus, the arrangement in accordance with the invention makes it possible to minimize variations in the air gaps resulting from the lamination stacks not being maintained in an abutting relationship and further makes it possible to minimize noise resulting from laminations not being held tightly in compression. With the arrangement of the present invention it was possible to maintain the air gap 17 within a tolerance of .0004 of an inch for transformers manufactured by semiautomatic assembly methods.

Referring to FIG. 3 there is shown a clamping and support member 58 with a plurality of mounting elements 59, 60, 61 and portion of a magnetic core 70 of the type shown in FIGS. 1 and 2. It will be seen that arcuate clamping flanges 62, 63, 64, 65 are formed integrally with web portion 66. Further, portions of arcuate clamping flanges 62, 64 are formed from material cut out from the cutout portions 67, 68 of the mounting elements 59, 60. It will be noted that the web portion 66 is substantially intact. Such an arrangement provides the advantage, in addition to the other advantages inherent in the construction of this invention, that the core and coil assembly can be mounted not only at the base but at either side. Obviously, the clamping and support member shown in FIG. 3 provides a more flexible mounting arrangement without sacrificing any of the other advantages of the invention.

It will be appreciated that the oppositely disposed arcuate clamping flanges, such as the portions of the flanges 62, 64 in FIG. 3, cooperate to maintain the stack of lamination disposed thereunder independently of the other flange of the clamping element. If the respective lamination stacks are not exactly of the same height, the respective arcuate flanges will clamp into the necessary relationship for the particular height of the lamination stack to which flanges are related and independently of the height of the other stack of laminations. As illustrated in FIGS. 1 and 2, two substantially identical clamping and support members 35, 36 are used. The provision of two such identical members permits the lamination stacks 12, 13 to be securely and independently clamped together at each end. I have found that by using a pair of identical clamping and support members results in the advantage that a more positive clamping action is afforded by the arcuate clamping flanges of the independent clamping element. It was discovered that the open circuit primary impedance at zero milliamperes D.C., 35 volts, 60 cycles could be maintained within five percent of the design value of the impedance in units produced by semiautomatic assembly methods.

In FIG. 4 I have shown a group of ten curves 71 representing open circuit primary impedance at 35 volts, 60 cycles plotted against milliamperes, D.C. for ten representative units. With prior art constructions it was not possible to consistently maintain the measured value of the primary open circuit impedance within the close tolerances that can be attained by the construction in accordance with the present invention. In applications of transformers in such circuits as the horizontal sweep circuits of television receivers, it is essential that the open circuit primary impedance of the transformer be maintained within close specifications. A principal advantage of the present invention resides in the fact that transformers incorporating the construction in accordance with the invention have an open circuit primary impedance that can be consistently maintained within significantly improved tolerances. Thus, this significant improvement in the transformer will enable the circuit designer to more precisely design the circuits in which the transformers are to be utilized.

The combined core clamping and support arrangement hereinbefore described has the further advantage that it easily lends itself to automatic or semiautomatic assembly methods. It will be seen that the two stacks 12, 13 of E-shaped laminations are initially assembled together on a preformed electrical coil 20. The clamping and support members 36, 37 are then forced over the assembled lamination stacks 12, 13 in a one step manufacturing operation. Heretofore, at least two manufacturing steps were required to obtain a clamped and mounted core and coil assembly using conventional constructions of the prior art. After the laminations have been clamped, the core and coil assembly 11 may be subjected, if desired, to a varnish treatment and the clamping and support members 12, 13 maintain the core and coil assembly 11 in tightly assembled relation while the varnish is being cured. It is found that the arrangement in accordance with the present invention eliminates the necessity for applying any cement to the gap between the center legs 18, 19.

While there has been shown and described a particular embodiment of the invention, it will be obvious to those skilled in the art that various changes and modifications can be made without departing from the invention. Therefore, I intend by the appended claim to cover all such modifications that fall within the true spirit and scope of the invention.

What I claim as new and desire to secure by Letters Patent of the United States is:

In a mountable magnetic core and coil assembly comprising a core formed of a plurality of superimposed laminations of flat stacked magnetic material, said magnetic core having a center winding leg member, a pair of outer leg members respectively disposed on opposite sides of said center winding leg member, a pair of transverse members joining said outer leg members with said center winding leg member and forming therewith a magnetic flux return path between the ends of said center winding leg members, said members defining a complete magnetic circuit, an electrical coil positioned on said center leg member, the improvement comprising: a separate clamping and support member juxtapositioned along each of said outer leg members, each of said clamping and support members including a clamping element having a web portion and clamping flanges disposed along the outer laminations of said outer leg members and transversely thereof along the edges of said transverse members, said clamping flanges engaging said laminations in tight assembled relation, and at least one mounting element integrally formed with said clamping element and having at least one cutout portion, said clamping and support members being of substantially identical configuration and said clamping flange adjacent to said mounting element being formed from the material of said cutout portion of said mounting element.

References Cited in the file of this patent

UNITED STATES PATENTS

| | | |
|---|---|---|
| 2,294,322 | Van der Woude | Aug. 25, 1942 |
| 2,494,350 | Mittermaier | Jan. 10, 1950 |
| 2,897,465 | Tinnerman | July 28, 1959 |

FOREIGN PATENTS

| | | |
|---|---|---|
| 669,296 | Great Britain | Apr. 2, 1952 |